United States Patent
Jensvold et al.

(10) Patent No.: US 9,034,957 B2
(45) Date of Patent: May 19, 2015

(54) HIGH-FLOW HOLLOW-FIBER MEMBRANES CONTAINING POLYMER BLENDS

(71) Applicant: Generon IGS, Inc., Houston, TX (US)

(72) Inventors: John A. Jensvold, Benicia, CA (US); Frederick L. Coan, Antioch, CA (US); Arthur J. Barajas, Oakley, CA (US)

(73) Assignee: Generon IGS, Inc., Houston, TX (US)

( * ) Notice: Subject to any disclaimer, the term of this patent is extended or adjusted under 35 U.S.C. 154(b) by 92 days.

(21) Appl. No.: 14/055,618

(22) Filed: Oct. 16, 2013

(65) Prior Publication Data

US 2014/0187683 A1 Jul. 3, 2014

Related U.S. Application Data

(60) Provisional application No. 61/746,672, filed on Dec. 28, 2012.

(51) Int. Cl.
| | | |
|---|---|---|
| *B01D 71/50* | (2006.01) | |
| *D01D 5/24* | (2006.01) | |
| *B01D 69/08* | (2006.01) | |
| *B01D 53/22* | (2006.01) | |

(52) U.S. Cl.
CPC *B01D 71/50* (2013.01); *D01D 5/24* (2013.01); *B01D 53/228* (2013.01); *B01D 69/087* (2013.01); *B01D 2256/12* (2013.01); *B01D 2257/102* (2013.01); *B01D 2323/12* (2013.01)

(58) Field of Classification Search
CPC .... B01D 71/50; B01D 53/228; B01D 69/087; B01D 2256/12; B01D 2257/102; B01D 2323/12; D01D 5/24
See application file for complete search history.

(56) References Cited

U.S. PATENT DOCUMENTS

| | | |
|---|---|---|
| 4,881,953 A | 11/1989 | Prasad |
| 4,962,131 A | 10/1990 | Beck |
| 5,141,530 A | 8/1992 | Jensvold |
| 5,598,874 A | 2/1997 | Alei |
| 7,497,894 B2 | 3/2009 | Jeffers |
| 7,517,388 B2 | 4/2009 | Jensvold |
| 7,578,871 B2 | 8/2009 | Jensvold |
| 7,662,333 B2 | 2/2010 | Coan |
| 8,171,710 B2 | 5/2012 | Coan |
| 8,317,899 B2 | 11/2012 | Jeffers |
| 8,398,755 B2 | 3/2013 | Coan |
| 8,409,324 B1 | 4/2013 | Straub |

*Primary Examiner* — Kriellion Sanders
(74) *Attorney, Agent, or Firm* — William H. Eilberg

(57) ABSTRACT

A composition for making polymeric fiber membranes, for use in non-cryogenic separation of gases, substantially improves product flow, with only a small decrease in the recovery ratio. The composition is a spin dope including tetrabromo bis-phenol A polycarbonate (TBBA-PC) and tetrabromo bishydroxyphenylfluorene polycarbonate (TB-BHPF-PC), in proportions, by weight, ranging (in percent) from about 60/40 to 40/60, and n-methyl pyrrolidinone (NMP) and triethylene glycol (TEG), wherein the ratio of the amounts of NMP to TEG, by weight, is in the range of about 1.6-2.5. The spin dope is used to make hollow fibers for use in gas-separation membrane modules.

14 Claims, No Drawings

HIGH-FLOW HOLLOW-FIBER MEMBRANES CONTAINING POLYMER BLENDS

CROSS-REFERENCE TO PRIOR APPLICATION

Priority is claimed from U.S. provisional patent application Ser. No. 61/746,672, filed Dec. 28, 2012, the disclosure of which is hereby incorporated herein.

BACKGROUND OF THE INVENTION

The present invention relates to a composition for a polymeric membrane which is used for the non-cryogenic separation of a gas.

It has been known to use a polymeric membrane to separate air into components. Various polymers have the property that they allow different gases to flow through, or permeate, the membrane, at different rates. A polymer used in air separation, for example, will pass oxygen and nitrogen at different rates. The gas that preferentially flows through the membrane wall is called the "permeate" gas, and the gas that tends not to flow through the membrane is called the "non-permeate" or "retentate" gas. The selectivity of the membrane is a measure of the degree to which the membrane allows one component, but not the other, to pass through.

A membrane-based gas separation system has the inherent advantage that the system does not require the transportation, storage, and handling of cryogenic liquids. Also, a membrane system requires relatively little energy. The membrane itself has no moving parts; the only moving part in the overall membrane system is usually the compressor which provides the gas to be fed to the membrane.

A gas separation membrane unit is typically provided in the form of a module containing a large number of small, hollow fibers made of the selected polymeric membrane material. The module is generally cylindrical, and terminates in a pair of tubesheets which anchor the hollow fibers. The tubesheets are impervious to gas. The fibers are mounted so as to extend through the tubesheets, so that gas flowing through the interior of the fibers (known in the art as the bore side) can effectively bypass the tubesheets. But gas flowing in the region external to the fibers (known as the shell side) cannot pass through the tubesheets.

In operation, a gas is introduced into a membrane module, the gas being directed to flow through the bore side of the fibers. One component of the gas permeates through the fiber walls, and emerges on the shell side of the fibers, while the other, non-permeate, component tends to flow straight through the bores of the fibers. The non-permeate component comprises a product stream that emerges from the bore sides of the fibers at the outlet end of the module.

An example of a membrane-based air separation system is given in U.S. Pat. No. 4,881,953, the disclosure of which is incorporated by reference herein.

Other examples of fiber membrane modules are given in U.S. Pat. Nos. 7,497,894, 7,517,388, 7,578,871, and 7,662,333, the disclosures of which are all hereby incorporated by reference.

The effectiveness of a membrane in gas separation depends not only on the inherent selectivity of the membrane, but also on its capability of handling a sufficiently large product flow. A membrane module can therefore be evaluated by its product flow, and by its recovery ratio, which is the ratio of product flow to feed gas flow.

The present invention provides a composition for polymeric fiber membranes which provides substantially improved performance, and which therefore lowers the capital cost for gas separation systems. The hollow fiber membrane of the present invention can be used to build a module having about twice the volumetric productivity of prior art modules, while retaining high efficiency in the separation of gases.

SUMMARY OF THE INVENTION

The present invention comprises a composition containing a mixture of tetrabromo bis-phenol A polycarbonate (TBBA-PC) and tetrabromo bishydroxyphenylfluorene polycarbonate (TBBHPF-PC), in proportions, by weight, ranging (in percent) from about 60/40 to 40/60. The most preferred proportion is about 50/50, i.e. an equal amount of each component.

The above-described composition is formed into a spin dope with n-methyl pyrrolidinone (NMP) and triethylene glycol (TEG). The preferred ratio, by weight, of NMP/TEG, is about 1.6-2.5, and preferably approximately 2. The spin dope produces hollow fibers which can be assembled into a module for non-cryogenic separation of air.

The fibers in the module may be coated with an aqueous solution of a non-ionic surfactant such as Triton X-100. The surfactant may be provided in a concentration of about 5-150 ppm, and preferably about 30 ppm.

The module produced according to the present invention shows a dramatic improvement in product flow, with only a relatively small decrease in recovery, as compared to modules of the prior art.

The present invention therefore has the primary object of improving the efficiency of membrane modules for non-cryogenic separation of gas into components.

The invention has the further object of providing a mixture of polymers which optimizes the performance of a membrane-based gas-separation module.

The invention has the further object of providing a composition for making hollow fibers for non-cryogenic separation of air, wherein the fibers exhibit about twice the volumetric productivity of prior art fibers, while retaining high separation efficiency.

The reader skilled in the art will recognize other objects and advantages of the present invention, from a reading of the following detailed description of the invention.

DETAILED DESCRIPTION OF THE INVENTION

The hollow fiber membranes of the present invention are made from a mixture of tetrabromo bis-phenol A polycarbonate (TBBA-PC) and tetrabromo bishydroxyphenylfluorene polycarbonate (TBBHPF-PC), in equal amounts by weight. That is, in one embodiment, the TBBA-PC and the TBBHPF-PC are provided such that the ratio of the weight of one component to the weight of the other is 50/50, or one.

Using the above-described 50/50 polymer mixture, a spin dope of polymer with n-methyl pyrrolidinone (NMP) and triethylene glycol (TEG) was used to spin the hollow fiber membranes. The fibers were leached of solvents, dried at elevated temperature, and collected in a bundle suitable for a membrane module. Fiber samples and membrane modules were tested and found to have high permeate flows relative to the state of the art fibers and modules.

The technique of spinning fibers from polymeric material is described in U.S. Pat. No. 4,962,131, the disclosure of which is hereby incorporated by reference. A diagram showing the formation of polymeric fibers by passing a liquid mixture through an extruder is provided in U.S. Pat. No. 5,598,874, the disclosure of which is also incorporated by reference. The process of forming hollow fibers from a spin dope is well-known in the prior art. The present invention concerns the composition of the spin dope, and the method comprising the use of this composition to form fibers. Thus, the invention is not limited to any particular apparatus for forming the spin dope into fibers.

The following Examples illustrate the making of polymer compositions according to the present invention. These Examples provide detailed information only on the parameters that are specific to the composition of the present invention. Other information, useful in the spinning of fibers, can be obtained from the above-cited patents, and should be deemed to apply to the following Examples, to the extent that they are not inconsistent with the present disclosure.

Example 1

A spin dope was formed, comprising (by weight) 22.5% TBBA-PC, 22.5% TBBHPF-PC, 18.6% TEG, and 36.4% NMP. The spin temperature was 65° C. The fiber size was 135×95 microns (i.e. outside diameter and inside diameter, respectively, of the hollow fiber). The line rate was 145 feet per minute. The drying temperature was 107° C.

The fibers were tested before being assembled into a module. The flow rate for oxygen through the membrane was measured to be 88.3 GPU, where GPU is a gas permeation unit (flow rate of gas through the membrane, per unit area, per unit of pressure difference across the membrane). The units of the GPU are defined as $10^{-6}$ sccm/(cm hg×cm$^2$ sec), where sccm is standard cubic centimeter, and "cm hg" means cm of hg pressure.

The ratio of the flow rate of oxygen to the flow rate of nitrogen was measured to be 5.6.

By comparison, a prior art fiber, in which the polymer was TBBA-PC, and no TBBHPF-PC was present, provided a flow rate of oxygen of 35, and a ratio of flow of oxygen to nitrogen of 6.5. Thus, the composition of the present invention provided substantially improved oxygen flow, with only a small reduction in the flow rate ratio.

Example 2

The fibers made according to Example 1 were assembled into a module. The dimensions of the module were 6×72 inches, and the module contained 562,500 fibers. The module was tested with compressed air at 135 psig, at a temperature of 25° C. The retentate (non-permeate) flow was adjusted, during this test, to produce a product 02 concentration of 1%.

The result was a flow of 1865 scfh, with a recovery ratio of 27.1%. The recovery ratio is the ratio of product flow to feed gas flow.

Example 3

The experiment of Example 2 was repeated for a polymer of the prior art, in which the polymer was TBBA-PC only, with no TBBHPF-PC included. The result was a flow rate of 835 scfh and a recovery ratio of 31%.

Thus, in comparing Examples 2 and 3, one sees that the fiber material of the present invention achieved a flow that was more than double that of the prior art, with only a small reduction in recovery ratio.

Example 4

The module produced in Example 2 was coated with a 30 ppm Triton X-100 solution in water, and redried and tested. The process for coating with Triton X-100, a non-ionic surfactant, was the same as that described in U.S. Pat. No. 5,141,530, the disclosure of which is hereby incorporated by reference.

The module coated with Triton X-100 produced a flow of 1477 scfh, and a recovery ratio of 34%.

Example 5

The experiment of Example 4 was repeated for a polymer of the prior art, in which the polymer was TBBA-PC only, with no TBBHPF-PC included. The result was a flow of 700 scfh and a recovery ratio of 36%. Again, the composition of the present invention yielded a flow that was more than double that of the prior art, with only a slight reduction in recovery.

Example 6

This Example shows the criticality of the concentration of the components in the polymer composition.

A membrane was produced from a mixture of 65X TBBA-PC and 35% TBBHPF-PC. The fibers were inserted into a module of similar size to those described above, and were given a treatment with Triton X-100, as above.

The resulting module produced a product flow of 1000 scfh, with a recovery ratio of 30%.

This result is not considered of commercial utility, because the increase in product flow is not enough to offset the drop in the recovery ratio.

The result of this Example also suggests that the preferred composition is achieved when the concentrations of TBBA-PC to TBBHPF-PC are closer to each other, such as in the range, in percent, of from 60/40 to 40/60.

The composition of the present invention, by more than doubling the product flow, with only a small decrease in the recovery ratio, can therefore reduce the capital cost for a membrane system, by more than 25%. About half the cost of a membrane system is typically due to the module itself.

The preferred composition of the present invention therefore comprises TBBA-PC and TBBHPF-PC, in ratios by weight which range, in percent, from 60/40 to 40/60. The breakthrough result appears to occur in the vicinity of 50/50.

In the preferred composition, the ratio of NMP to TEG is in the range of about 1.6 to 2.5.

In making the preferred composition, the spin temperature should be in the range of about 50-85° C. The quench and leach temperature ranges are the same as in U.S. Pat. No. 5,141,530, cited above. The drying temperature should be in a range of about 100-120° C.

In the preferred composition, if a surfactant coating is provided in the form of Triton X-100, it should be present in a concentration of about 5-150 ppm. Other surfactants can be used instead of Triton X-100, as set forth in the above-cited patent.

The person skilled in the art will recognize various modifications of the composition, which should be considered within the spirit and scope of the following claims.

What is claimed is:

1. A composition for use in making polymeric fiber membranes, the composition comprising a spin dope including:
   a) a mixture of tetrabromo bis-phenol A polycarbonate (TBBA-PC) and tetrabromo bishydroxyphenylfluorene polycarbonate (TBBHPF-PC), in proportions, by weight, ranging (in percent) from about 60/40 to 40/60, and b) n-methyl pyrrolidinone (NMP) and triethylene glycol (TEG), wherein a ratio of NMP to TEG, by weight, is in a range of about 1.6-2.5.

2. The composition of claim 1, wherein the TBBA-PC and TBBHPF-PC are provided in substantially equal amounts, by weight.

3. The composition of claim 1, wherein the ratio of NMP to TEG is about 2.

4. The composition of claim 2, wherein the ratio of NMP to TEG is about 2.

5. The composition of claim 1, wherein the spin dope comprises, by weight, 22.5% TBBA-PC, 22.5% TBBHPF-PC, 18.6% TEG, and 36.4% NMP.

6. A method of making polymeric fiber membranes for use in non-cryogenic gas separation, the method comprising the steps of:
   a) combining tetrabromo bis-phenol A polycarbonate (TBBA-PC) and tetrabromo bishydroxyphenylfluorene polycarbonate (TBBHPF-PC), in proportions, by weight, ranging (in percent) from about 60/40 to 40/60, to form a mixture,
   b) adding the mixture of step (a) to a mixture of n-methyl pyrrolidinone (NMP) and triethylene glycol (TEG), wherein a ratio of NMP to TEG, by weight, is in a range of about 1.6-2.5, so as to form a spin dope, and
   c) forming the spin dope into hollow fibers.

7. The method of claim 6, further comprising passing gas through said fibers so as to separate the gas into components.

8. The method of claim 6, further comprising providing the TBBA-PC and TBBHPF-PC in substantially equal amounts, by weight.

9. The method of claim 6, further comprising providing the NMP and TEG in a ratio which is about 2.

10. The method of claim 8, further comprising providing the NMP and TEG in a ratio which is about 2.

11. The method of claim 6, further comprising coating the fibers with an aqueous solution of a non-ionic surfactant.

12. The method of claim 11, further comprising selecting the non-ionic surfactant to be in a concentration of about 5-150 ppm.

13. The method of claim 6, wherein step (c) is performed at a temperature in a range of about 50-85° C.

14. The method of claim 11, wherein step (c) is performed at a temperature in a range of about 50-85° C.

* * * * *